United States Patent [19]

Harlamert

[11] 4,097,189
[45] Jun. 27, 1978

[54] AIRCRAFT PROPELLER AND BLADE PITCH CONTROL SYSTEM

[75] Inventor: W. Benjamin Harlamert, Piqua, Ohio
[73] Assignee: Hartzell Propeller, Inc., Piqua, Ohio
[21] Appl. No.: 725,008
[22] Filed: Sep. 20, 1976
[51] Int. Cl.² .................................................. B64C 11/38
[52] U.S. Cl. ........................................ 416/46; 416/48; 416/154
[58] Field of Search .................................. 416/46–49, 416/154, 50, 153

[56] References Cited

U.S. PATENT DOCUMENTS

| | | | |
|---|---|---|---|
| 2,600,017 | 6/1952 | Morris et al. | 416/46 |
| 2,745,500 | 5/1956 | Moore et al. | 416/49 X |
| 2,980,188 | 4/1961 | Allen et al. | 416/46 |
| 3,027,949 | 4/1962 | Biermann | 416/49 |
| 3,102,596 | 9/1963 | Newton et al. | 416/46 |
| 3,115,937 | 12/1963 | Biermann | 416/46 |
| 3,115,938 | 12/1963 | Fischer et al. | 416/50 X |
| 3,167,131 | 1/1965 | Voisard | 416/46 X |
| 3,207,227 | 9/1965 | Timewell | 416/46 |
| 3,439,745 | 4/1969 | Gaubis et al. | 416/49 |

*Primary Examiner*—Everette A. Powell, Jr.
*Attorney, Agent, or Firm*—Jacox & Meckstroth

[57] ABSTRACT

A propeller hub supports a plurality of angularly disposed propeller blades which are movable by a hydraulic cylinder between a high pitch position and a reverse position through a low pitch position. Hydraulic fluid is supplied to the cylinder from a governor unit driven by the aircraft engine, and a fluid pressure responsive relief valve controls the pressure of the hydraulic fluid. The pressure responsive relief valve is manually adjustable by the aircraft pilot to change the fluid pressure at which the valve responds in order to change the pitch of the propeller blades. The fluid pressure must be increased above a predetermined normal operating limit for actuating the cylinder against the bias of a spring within the propeller to move the blades to their reverse pitch position. In addition, a centrifugally actuated lock unit prevents actuation of the cylinder and movement of the blades to their reverse pitch position until the speed of the propeller is reduced to a slow idle. The pressure responsive relief valve also incorporated hydraulic means to assure that the valve responds immediately to the pilot's command.

20 Claims, 5 Drawing Figures

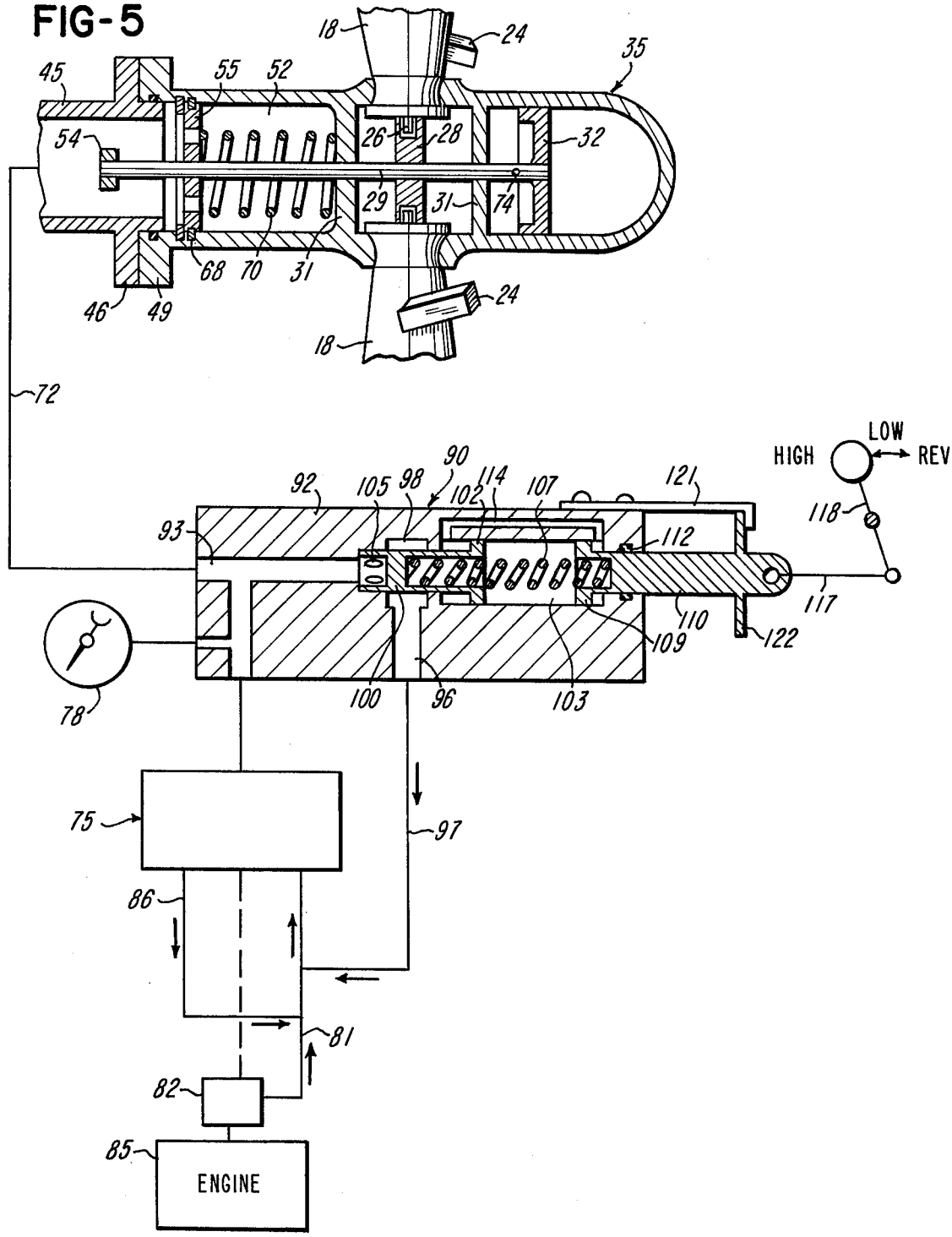

AIRCRAFT PROPELLER AND BLADE PITCH CONTROL SYSTEM

BACKGROUND OF THE INVENTION

The present invention relates to variable pitch aircraft propellers of the general type disclosed in U.S. Pat. Nos. 3,380,535 and 3,575,529 which issued to the assignee of the present invention and which incorporate a control mechanism for changing the pitch of the propeller blades between a high pitch position and a reverse position through a low pitch position. In general, such variable pitch aircraft propellers usually incorporate a hydraulic actuating cylinder which rotates with the hub of the propeller and which receives hydraulic fluid from a governor unit driven by the aircraft engine. The governor unit preferably incorporates a positive displacement hydraulic pump which supplies hydraulic fluid through a governor control valve actuated by flyball weights responsive to the speed of the engine shaft. The governor control valve operates to maintain the engine speed substantially constant by precisely controlling the pitch of the propeller blades, but can be manually adjusted to change the blade pitch during flight.

As disclosed in the above patents, the supply of the hydraulic fluid from the governor unit to the blade pitch actuating cylinder on the propeller is controlled by a valve system which is actuated directly by the aircraft pilot through a linkage system extending from the pilot's cabin. Usually, the propeller blades are provided with counter weights which are effective to rotate the blades to a high pitch position, and an increase in the pressure of the hydraulic fluid or oil supplied from the governor unit to the actuating cylinder is effective to rotate the blades to a low pitch position and also into a reverse pitch position. The pilot control lever for changing the pitch of the propeller blades, may also be provided with a detent which indicates to the pilot when the blades are at a low pitch position.

SUMMARY OF THE INVENTION

The present invention is directed to an improved variable pitch aircraft propeller and control system which are not only more simple in construction and more dependable in operation than previously known control systems, but are also adapted to be used with a greater variety of aircraft engines so that reversible type propellers may be used on larger number of aircrafts. The propeller and control system of the invention are also constructed with all internal components so that they are more tamper resistant and require less maintenance due to self-lubrication of the components by the actuating fluid or oil.

In general, the above features and advantages are provided in a preferred embodiment of the invention by connecting to the propeller actuating cylinder an axially extending pitch change rod which carries a stop collar. When the hydraulic cylinder is actuated to move the propeller blades to their low pitch position, the stop collar engages a spring-loaded centrifugally actuated lock member which prevents further movement of the actuating cylinder until the propeller speed is reduced to a slow idle to release the lock member. In order to change the pitch of the blades to a reverse pitch position, the spring-loaded lock member must be compressed by increasing the pressure of the hydraulic fluid supplied to the propeller actuating cylinder.

The hydraulic fluid is supplied from the governor unit at a relatively high pressure, and the setting of a pressure responsive relief valve determines the pressure of the hydraulic fluid supplied to the pitch change actuating cylinder within the propeller. The pressure at which the relief valve operates is adjustable by manually adjusting a control plunger which is connected to the relief valve by a pressure control spring. The pressure of the hydraulic fluid supplied to the propeller actuating cylinder is indicated by a pressure gauge within the pilot's cabin, and the gauge is calibrated to indicate the pitch position of the propeller blades.

Other features and advantages of the invention will be apparent from the following description, the accompanying drawings and the appended claims.

BRIEF DESCRIPTION OF THE DRAWINGS

FIG. 5 is a diagramatic illustration of the propeller and control system constructed in accordance with the invention.

DESCRIPTION OF THE PREFERRED EMBODIMENT

Figure 1:
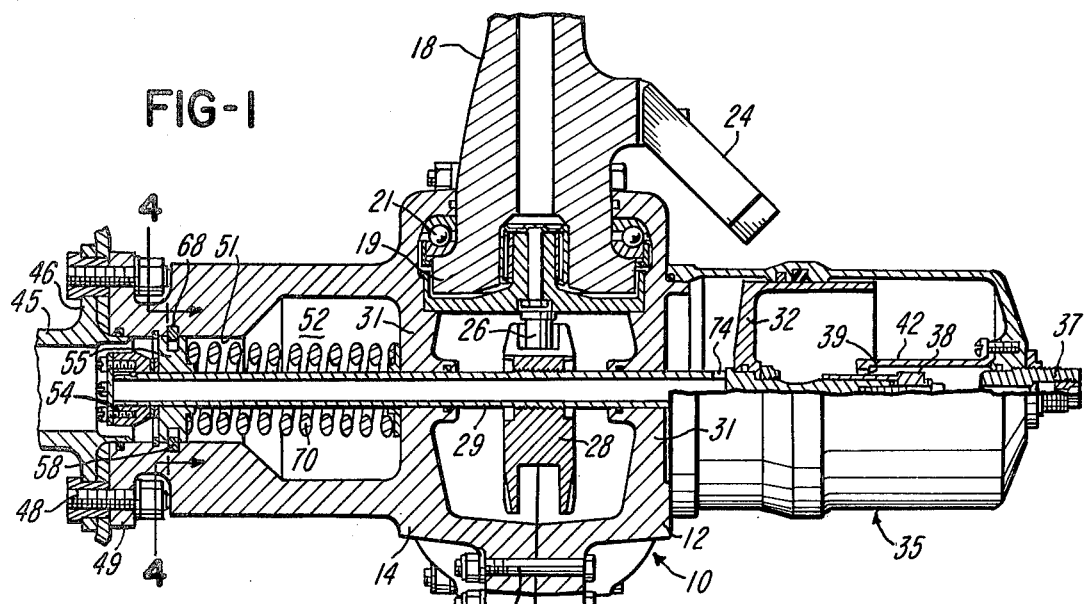
FIG. 1 is a fragmentary axial section of a reversing aircraft propeller hub and blade assembly constructed in accordance with the invention.
Figure 3:
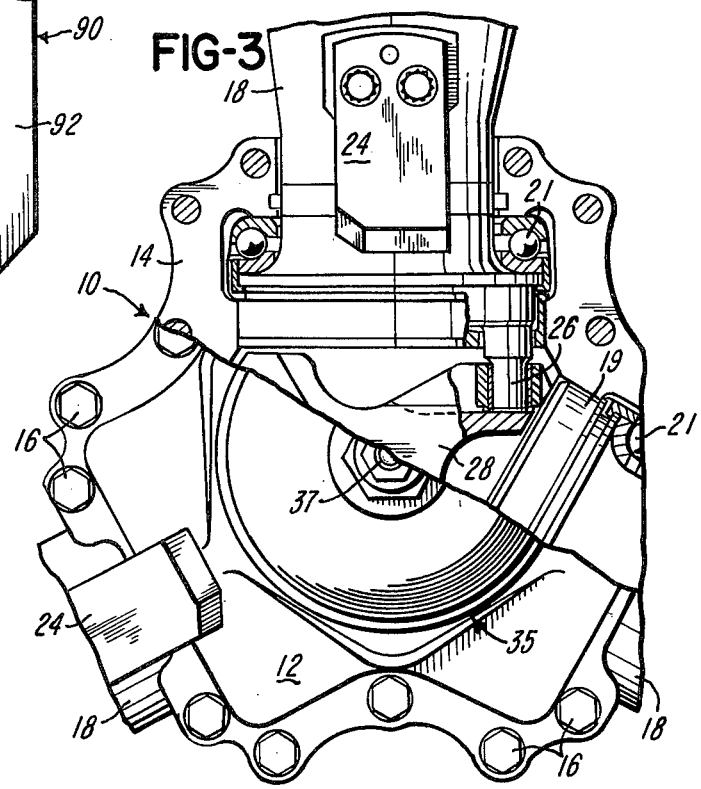
FIG. 3 is a fragmentary end view of the propeller hub shown in FIG. 1, with a portion broken away to show internal assembly.

The aircraft propeller assembly shown in FIGS. 1 and 3 includes a hub unit 10 formed by a forward hub section 12 and a rearward hub section 14 which are coupled or clamped together by a series of peripherally spaced bolts 16. A plurality of angularly arranged propeller blades 18 project radially outwardly from the hub unit 10, and each blade 18 includes a base portion 19 which is retained by an external antifriction bearing 21 clamped between the mating hub sections 12 and 14. A counterweight member 24 is rigidly secured to each propeller blade 18 and normally operates to rotate the blade towards a high pitched position in a conventional manner.

An eccentrically located stud 26 projects inwardly from the base portion 19 of each propeller blade 18 and engages a corresponding bushing located within a fork member 28 which is rigidly secured to an axially extending tubular actuating rod 29. The actuating rod 29 is supported for axially sliding movement by bores within walls 31 of the hub sections 12 and 14, and the forward end portion of the rod 29 is rigidly connected to a piston 32 forming part of a hydraulic cylinder unit 35. The cylinder unit 35 is mounted on the forward hub section 12 and supports an axially adjustable stop screw 37 which is positioned to limit the forward movement of the actuating rod 29 when the piston 32 is moved to the right (FIG. 1) to effect reversing of the pitch of the propeller blades, as will be explained later.

A sleeve 38 is secured to the forward end portion of the actuating rod 29 in front of the piston 32 and has a rearwardly facing shoulder which is adapted to engage an internal shoulder 39 formed within a tubular stop member 42 surrounding the sleeve 38 and rigidly secured to the forward end wall of the cylinder unit 35.

When the actuating rod 29 and piston 32 are moved towards the left (FIG. 1) for increasing the pitch of the propeller blades 18, the sleeve 38 engages the stop member 42 to limit rotation of the propeller blades at a high pitch position.

As illustrated in FIG. 1, the rearward hub section 14 has a hollow rearward end portion which mounts on the forward end of a hollow aircraft engine shaft 45. The engine shaft 45 includes a mounting flange 46 which is rigidly secured by a series of peripherally spaced bolts 48 to an opposing mounting flange 49 formed as an integral part of the rearward hub section 14. The rearward hub section 14 has a cylindrical bore 51 which extends rearwardly from a chamber 52.

Figure 4:
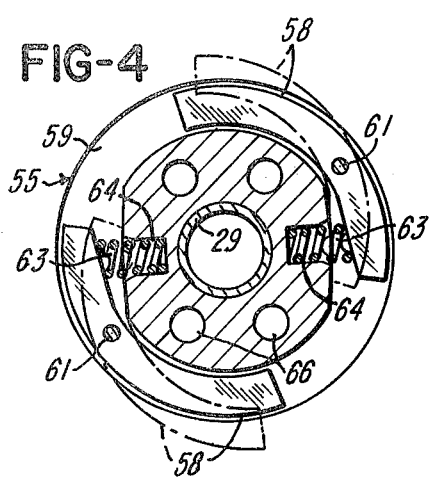
FIG. 4 is a fragmentary section taken generally on the line 4—4 of FIG. 1.

An annular stop collar 54 is rigidly secured to the rearward end portion of the tubular actuating rod 29, and forward movement of the actuating rod 29 and stop collar 54 are normally limited by a low pitch annular lock member 55 which is supported for axial sliding movement within the cylindrical bore 51. The lock member 55 incorporates a centrifugal lock system which includes a pair of arcuate locking elements 58 (FIG. 4) disposed within a circumferential groove 59 formed within the lock member 55. Each of the locking elements 58 is pivotally supported by a cross pin 61 and is urged towards the full line position shown in FIG. 4 by a compression spring 63 confined within a corresponding hole 64 formed in the lock member 55 and engaging an end portion of the locking element.

The low pitch lock member 55 is also provided with a plurality of axially extending fluid passages 66 through which hydraulic fluid flows to the hub chamber 52. An annular groove 68 (FIG. 1) is formed within the cylindrical bore 51 and is adapted to receive the locking elements 58 when the propeller is rotated above a predetermined idle speed and the groove 59 is radially aligned with the groove 68. An axially extending compression spring 70 surrounds the rearward portion of the actuating rod 29 and extends within the hub chamber 52 from the adjacent internal wall 31 to the lock member 55.

Referring to FIG. 5, hydraulic fluid is supplied to the aircraft propeller through a line 72 which connects with the hollow engine shaft 45 through suitable rotary coupling (not shown). The hydraulic fluid flows through the tubular actuating rod 29 and outwardly through a port 74 to the chamber at the rear of the piston 32 of the cylinder unit 35. The hydraulic fluid is also free to flow through the passages 66 within the lock member 55 and into the hub chamber 52.

A governor unit 75 (FIG. 5) supplies the hydraulic fluid to the line 72 at a maximum predetermined pressure, for example, 300 p. s. i. The governor unit 35 is constructed as diagrammatically illustrated in above mentioned U.S. Pat. Nos. 3,380,535 and 3,575,529. The unit 35 includes flyweights which are driven by the aircraft engine along with a hydraulic gear pump. The flyweights actuate a valve which controls the flow of oil to the propeller cylinder unit 35 so that the pitch of the propeller blades is automatically controlled for maintaining a substantially constant propeller speed when the aircraft is in normal flight.

The pressure of the hydraulic fluid within the line 72 is indicated by a gauge 78 which is located in the pilot's cabin, and the gauge is calibrated to provide a visual indication of the pitch of the propeller blades. The hydraulic fluid is supplied to the governing unit 75 through a line 81 which connects with a main pump 82 also driven by the aircraft engine 85 to provide a predetermined supply pressure, for example, 50 p. s. i. The governor unit 75 incorporates a bypass valve and return line 86 for the positive displacement pump in the governor unit to assure that the maximum pressure within the line 72 does not exceed the predetermined pressure such as 300 p. s. i.

Figure 2:
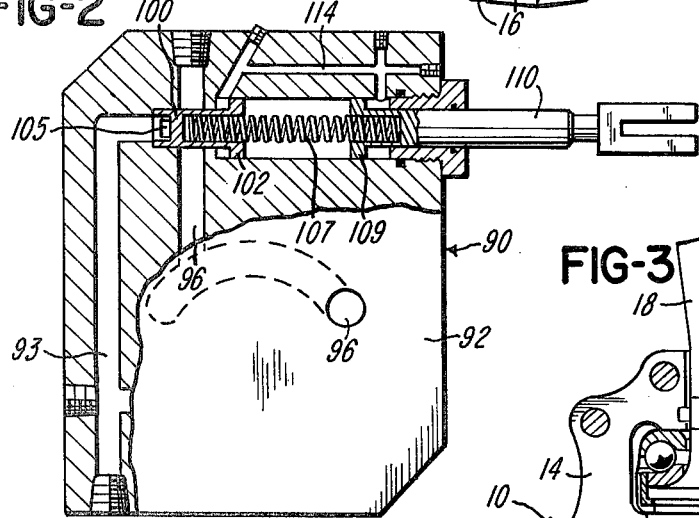
FIG. 2 is a partial section view of a unit for controlling the pressure of the hydraulic fluid supplied to the aircraft propeller hub.

A pressure control unit 90 (FIGS. 2 and 5) is connected to control the maximum pressure of the hydraulic fluid within the line 72 and is actuated when it is desired to change the pitch of the propeller blades from the low pitch position to the reverse pitch position. The unit 90 includes a valve body 92 which defines a passage 93 connected to the hydraulic fluid supply line 72. The valve body 92 also has a passage 96 which connects with a return line 97 extending to the low pressure fluid supply line 81. The lines 93 and 96 are connected within the valve body 92 by a valve chamber 98, and a pressure responsive or relief valve member 100 is supported for axial sliding movement within the valve chamber 98.

The valve member 100 includes a cylindrical piston head portion 102 which is supported for sliding movement within a cylindrical chamber 103 also formed within the valve body 92. The pressure relief valve member 100 also includes a tubular inner end portion which has a plurality of peripherally spaced ports 105. The opposite end portion of the valve member 100 has a cylindrical bore which receives one end portion of a compression spring 107. The opposite end portion of the spring 107 projects into an annular piston head 109 of a control plunger 110. The plunger 110 is supported for axial sliding movement within the valve body 92, and an O-ring 112 forms an oil-tight seal between the plunger 110 and the valve body.

The chamber 103 is adapted to receive hydraulic fluid by leakage along the pressure relief valve member 100 and its piston head portion 102. The hydraulic fluid is also free to leak or seep past the piston head portion 109 of the control plunger 110, and the opposite end portions of the chamber 103 are connected by a fluid passage 114 so that the fluid pressure within the chamber 103 is free to equalize on both sides of each of the piston head portions 102 and 109. The outer end portion of the control plunger 110 is connected by a linkage 117 to a pivotally supported control lever 118 which is shifted by the aircraft pilot when he desires to change the pitch of the propeller blades. The control lever 118 pivots between a high pitch position and a reverse pitch position through a low pitch position. The lever 118 is provided with a restraining detent at the high pitch position for indicating to the pilot when the propeller blades are at their flight position. A stop arm or member 121 is secured to the body 92 of the pressure control unit 90 and is adapted to engage a projection 122 on the control plunger 110 to limit the outward movement of the control plunger at the high pitch position of the propeller blades.

In operation of the propeller control system, when the aircraft is in flight, the pitch of the propeller blades may be changed by the pilot to maintain a constant rpm controlled by the governor valve system while the control lever 118 is at the high pitch position. As apparent from FIG. 5, movement of the lever 118 varies the force exerted by the compression spring 107 on the pressure responsive relief valve member 100. Thus when it is desired to increase the pitch of the propeller blades, the force exerted on the valve member 100 is decreased so that the valve member shifts to the right (FIG. 5) at a lower pressure within the line 72 and permits a greater amount of fluid supplied by the governor unit 75 to recirculate through the passage 96, ports 105 and return line 97. A decrease of the pressure within the line 72 permits the assembly of the piston 32, actuating rod 29 and stop collar 52 to move to the left (FIG. 5) in response to the torque applied to the propeller blades by the counterweights 24, thereby increasing the pitch of the propeller blades.

As the control lever 118 is moved toward the low pitch position after landing, an increasing force is exerted on the relief valve member 100 by the compression spring 107, thereby increasing the pressure of the fluid within the line 72 to the chamber in back of the piston 32 of the cylinder unit 35. When the lever 118 is set at the low pitch position, the stop collar 54 engages the low pitch lock member 55 which is locked to the propeller hub by the centrifugally actuated locking elements 58 projecting into the internal groove 68 within the propeller hub. When the lock member 55 is locked, the actuating rod 29 and piston 32 are prevented from further movement to the right (FIG. 1), and the propeller blades 18 are prevented from moving past the low pitch position towards a zero pitch position.

After the aircraft has landed and it is desirable to reverse the pitch of the propeller blades for deacceleration, the speed of the engine and the propeller is decreased to a low rpm, for example, 800 to 900 rpm. At this low idle speed, the locking members 58 retract into the groove 59 in response to the force exerted by the springs 63 so that the lock member 55 is free to move axially or forwardly within the bore 51. To reverse the pitch of the propeller blades 18, the pilot control lever 118 is pivoted from the detent low pitch position towards the reverse pitch position so that additional force is exerted on the pressure relief valve member 100 by the compression spring 107, as mentioned above. This causes an increase in the pressure within the fluid supply line 72 and against the piston 32 of the cylinder unit 35. As the fluid pressure exceeds a predetermined value, such as 150 p. s. i., which corresponds to the low pitch position, the spring 70 is compressed by forward movement of the lock member 55 with the assembly of the piston 32, actuating rod 29 and stop collar 54. Thus the spring 70 assures that a substantial increase in the fluid pressure must first occur before the propeller blades can move from the high pitch position through the low pitch position to a reverse pitch position.

After the centrifugally actuated locking elements 58 retract in response to a low idle speed, and the lock member 55 is shifted forwardly within the bore 51 by an increase of fluid pressure within the line 72, the speed of the engine and propeller may be increased, and the pitch of the propeller blades may be shifted between a full reverse position and up to a low pitch position to assist in maneuvering the aircraft on the ground. However, if the control lever 118 is pivoted to the detent low pitch position while the propeller is rotating above the low idle speed, the centrifugally actuated locking elements 58 will shift outwardly into the groove 68, thereby again locking the lock member 55 against axial movement and preventing the propeller blades from returning to a zero or reverse pitch position without first decreasing the propeller speed.

From the drawings and the above description, it is apparent that a propeller and control system constructed in accordance with the present invention, provide desirable features and advantages. For example, as one primary feature, the reversing propeller and control system are of simplified construction relative to other reversing propeller and control systems for aircraft, thereby providing for more dependable operation. Another feature is provided by the internal construction and assembly of the actuating rod 29, stop collar 54, centrifugally actuated lock member 55 and the compression spring 70. That is, the internal assembly and operation of these components allow the aircraft propeller to be used with a greater variety of aircraft engines so that the propeller and control system of the invention are more versatile. Furthermore, since all of the actuating or movable components of the control system are exposed to the hydraulic control fluid or oil, all components are continuously lubricated which provides for minimizing the maintenance for the propeller assembly and control system. The internal assembly of the components also prevents tampering with the control system without disassembly.

Another important feature is provided by the fact that the chamber 103 (FIG. 5) within the body 92 of the pressure control unit 90, is at all times filled with hydraulic fluid between the piston head portions 102 and 109. Thus when the control plunger 110 is shifted axially to change the pitch of the propeller blades, the relief valve member 100 responds immediately due to the incompressibility of the fluid. The seepage of the fluid past the piston head portions 102 and 109 and the interconnecting passage 114 cooperate to permit the relief valve member 100 to seek its balance position corresponding to the force exerted by the compression spring 107 and the pressure of the fluid within the passage 93.

While the specific form of aircraft propeller and control system herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. An aircraft propeller and control system comprising a propeller hub adapted to be driven by an engine and supporting a plurality of angularly disposed adjustable pitch propeller blades, means including a hydraulic fluid cylinder connected to adjust the pitch of said blades, means for supplying hydraulic fluid to said cylinder and including a fluid pressure responsive relief valve having means for relieving the pressure of the hydraulic fluid supplied to said cylinder when the pressure exceeds a predetermined pressure limit corresponding to a pitch position of said blades, a movable pitch control member adapted to be located within the aircraft cabin, and said relief valve having a pressure member connected to move with said control member for infinitely varying said pressure limit of said relief valve within a predetermined range for changing the pitch of said blades.

2. An aircraft propeller and control system as defined in claim 1 wherein said fluid cylinder includes a piston connected to a pitch control rod supported for axial movement on the rotary axis of said propeller, and centrifugally actuated means for limiting the axial movement of said rod and said piston when the speed of said propeller exceeds a predetermined level.

3. An aircraft propeller and control system as defined in claim 2 wherein said centrifugally actuated means include a lock member surrounding said control rod and supported by said hub for axial movement, and speed responsive means for locking said lock member to said hub when the propeller speed exceeds said predetermined level.

4. An aircraft propeller and control system as defined in claim 3 including a spring for biasing axial movement of said lock member, stop means carried by said rod and engagable with said lock member when said blades are moved to a low pitch position, and said stop means and said lock member are movable against the bias of said spring when said blades are moved to a reverse pitch position.

5. An aircraft propeller and control system as defined in claim 1 wherein said relief valve includes a movable valve member, a compression spring having one end portion acting on said valve member, and said pressure member is connected to the opposite end of said spring to effect changing the releasing pressure of relief valve.

6. An aircraft propeller and control system as defined in claim 1 wherein said relief valve includes means defining a cylindrical chamber, a valve member slidably supported within said chamber, said pressure member comprising a plunger slidably supported within said chamber, and a compression spring extending between said valve member and said plunger.

7. An aircraft propeller and control system as defined in claim 6 including means for supplying hydraulic fluid into said chamber between said valve member and said plunger to effect immediate movement of said valve member in response to movement of the plunger, and means including a fluid bypass passage for equalizing the fluid pressure adjacent said valve member and said plunger to assure positioning of said valve member according to the compression of said spring by said plunger.

8. An aircraft propeller and control system as defined in claim 1 wherein said means for supplying hydraulic fluid to said cylinder include a governor responsive to the speed of said propeller and having a pump for supplying hydraulic fluid at a predetermined pressure, means defining a fluid supply passage connecting said governor to said cylinder, and said pressure responsive relief valve is connected to control the pressure within said passage by controlling a return flow of fluid to said governor.

9. An aircraft propeller and control system comprising a propeller hub adapted to be driven by an engine and supporting a plurality of angularly disposed adjustable pitch propeller blades, means including a hydraulic fluid cylinder connected to adjust the pitch of said blades between a high pitch position and a reverse position, an actuating rod connected to a piston within said cylinder and extending along the axis of said propeller, means for supplying hydraulic fluid to said cylinder and including a fluid pressure responsive relief valve having means for relieving the pressure of the hydraulic fluid supplied to said cylinder when the pressure exceeds a predetermined pressure limit corresponding to a pitch position of said blades, centrifugally actuated means for locking said actuating rod to said hub when he speed of said propeller exceeds a predetermined limit, and pilot control means for changing said pressure limit of said relief valve for changing the pitch of said blades.

10. An aircraft propeller and control system as defined in claim 9 wherein said centrifugally actuated means include a lock member surrounding said actuating rod and supported by said hub for axial movement, and at least one speed responsive movable element for locking said lock member to said hub when the propeller speed exceeds said predetermined limit.

11. An aircraft propeller and control system as defined in claim 9 including a spring surrounding said actuating rod for biasing axial movement of said locking means, stop means carried by said actuating rod, and said stop means and said locking means are movable against the bias of said spring when said blades are moved to said reverse pitch position.

12. An aircraft propeller and control system as defined in claim 9 wherein said relief valve includes a movable valve member, a compression spring having one end portion acting on said valve member, and said pilot control means is connected to adjust the position of the opposite end of said spring infinitely within a predetermined range to effect changing the releasing pressure of relief valve.

13. An aircraft propeller and control system comprising a propeller hub adapted to be driven by an engine and supporting a plurality of angularly disposed adjustable pitch propeller blades, means including a hydraulic fluid cylinder connected to adjust the pitch of said blades, means for supplying hydraulic fluid to said cylinder and including a fluid pressure responsive relief valve having means for relieving the pressure of the hydraulic fluid supplied to said cylinder when the pressure exceeds a predetermined pressure limit corresponding to a pitch position of said blades, said relief valve including means defining a cylindrical chamber, a valve member slidably supported within said chamber, a plunger slidably supported within said chamber, a compression spring extending between said valve member and said plunger, and means for adjusting the position of said plunger infinitely within a predetermined range for changing said pressure limit of said relief valve to effect pitch change of said blades.

14. An aircraft propeller and control system as defined in claim 13 including means for supplying hydraulic fluid into said chamber between said valve member and said plunger to effect immediate movement of said valve member in response to movement of the plunger, and means including a fluid bypass passage for equalizing the fluid pressure adjacent said valve member and said plunger to assure positioning of said valve member according to the compression of said spring by said plunger.

15. An aircraft propeller and control system comprising a propeller hub adapted to be driven by an engine and supporting a plurality of angularly disposed adjustable pitch propeller blades, means including a hydraulic fluid cylinder connected to adjust the pitch of said blades, means including an engine driven governor unit for supplying hydraulic fluid to said cylinder, a fluid pressure responsive relief valve connected between said governor unit and said fluid cylinder, said relief valve including a movable valve member biased by a spring and having means for relieving the pressure of the hydraulic fluid supplied to said cylinder from said governor unit when the pressure exceeds a predetermined pressure limit corresponding to a pitch position of said blades, and pilot control means for infinitely changing the force exerted by said spring on said valve member within a predetermined range for changing the pitch of said blades.

16. An aircraft propeller and control system as defined in claim 15 wherein said fluid cylinder includes a piston connected to a pitch control rod supported for axial movement on the rotary axis of said propeller, and centrifugally actuated means for limiting the axial movement of said rod and said piston when the speed of said propeller exceeds a predetermined level.

17. An aircraft propeller and control system as defined in claim 15 wherein said relief valve includes means defining a chamber, said valve member is slidably supported within said chamber, said pilot control means include a plunger slidably supported within said chamber, a compression spring extending between said valve member and said plunger, and means for infinitely adjusting the position of said plunger within a predetermined range.

18. An aircraft propeller and control system comprising a propeller hub adapted to be driven by an engine and supporting a plurality of angularly disposed adjustable pitch propeller blades, means including a hydraulic fluid cylinder connected to adjust the pitch of said blades between a high pitch position and a reverse position, an actuating rod connected to a piston within said cylinder and extending along the axis of said propeller, means including an engine driven governor unit for supplying hydraulic fluid to said cylinder, centrifugally actuated means including a lock member surrounding said actuating rod and supported by said hub for axial movement, a stop member mounted on said rod, and a compression spring surrounding said rod for biasing axial movement of said lock member and said stop member as a unit when said blades are moved to said reverse pitch position.

19. An aircraft propeller and control system as defined in claim 18 wherein said means for supplying hydraulic fluid to said cylinder include a fluid pressure responsive relief valve having means for relieving the pressure of the hydraulic fluid supplied to said cylinder when the pressure exceeds a predetermined limit corresponding to a pitch position of said blades, and pilot control means for changing said pressure limit of said relief valve for changing the pitch of said blades.

20. An aircraft propeller and control system as defined in claim 18 wherein said lock member comprises a spool-like body having a circumferential groove, at least one locking element support for pivotal movement within said groove between a retracted low speed position and an extended high speed position, and means defining a circumferential groove within said hub for receiving said locking element in said high speed position to effect locking of said lock member and said rod to said hub.

* * * * *